United States Patent [19]

Menzel

[11] Patent Number: 4,616,495

[45] Date of Patent: Oct. 14, 1986

[54] HELICALLY-FORMED PIPE WINDING MACHINE

[75] Inventor: Stanley W. O. Menzel, Hartsville, S.C.

[73] Assignee: Rib Loc Hong Kong Limited, Hong Kong

[21] Appl. No.: 807,772

[22] PCT Filed: May 20, 1983

[86] PCT No.: PCT/AU83/00065

§ 371 Date: Jan. 10, 1984

§ 102(e) Date: Jan. 10, 1984

[87] PCT Pub. No.: WO83/04196

PCT Pub. Date: Dec. 8, 1983

Related U.S. Application Data

[63] Continuation of Ser. No. 572,534, Jan. 10, 1984, abandoned.

[30] Foreign Application Priority Data

May 27, 1982 [AU] Australia ............................. PF4172

[51] Int. Cl.$^4$ ............................................. B21C 37/12
[52] U.S. Cl. ...................................................... 72/49
[58] Field of Search ................... 72/49, 50, 135, 137, 72/166, 168, 169; 228/17, 17.7, 145, 146, 147, 149

[56] References Cited

U.S. PATENT DOCUMENTS

| | | | |
|---|---|---|---|
| 2,868,265 | 1/1959 | Williams | 72/173 X |
| 3,538,728 | 11/1970 | Trihey | 72/23 |
| 3,566,643 | 3/1971 | Westerbarkey | 72/49 |
| 3,595,046 | 7/1971 | Malkki et al. | 72/49 |
| 3,865,146 | 2/1975 | Meserole | 72/50 X |
| 4,058,997 | 11/1977 | Siegwart | 72/50 |
| 4,337,564 | 7/1982 | Menzel et al. | 72/50 X |

FOREIGN PATENT DOCUMENTS

| | | | |
|---|---|---|---|
| 1075530 | 2/1960 | Fed. Rep. of Germany | 72/49 |
| 1103272 | 3/1961 | Fed. Rep. of Germany | 72/49 |
| 1123641 | 2/1962 | Fed. Rep. of Germany | 72/49 |
| 2027373 | 2/1980 | United Kingdom | 72/49 |

Primary Examiner—E. Michael Combs

[57] ABSTRACT

A machine for forming helically wound pipes from a strip (15), having interengaging means on its longitudinal edges, in which a series of rollers (2 and 3) is positioned to form an annulus of rollers (2 and 3) arranged to curve the strip (15) to a helical form within the annulus with the edges of the strip (15) overlapping and means (18, 19) to press the interchanging means on the overlapping edges together to form a pipe (5), in which a pair of feed rollers (16, 17) remote from the means to press (18, 19) controls the rate of feed of the strip (15) to maintain the strip (15) between the feed rollers (16, 17) and the means to press (18, 19) in tension. A modification drives all of the rollers of the annulus synchronously.

13 Claims, 17 Drawing Figures ized pipe winding machine and in particular it relates
HELICALLY-FORMED PIPE WINDING MACHINE This application is a continuation of application Ser. No. 572,534 filed Jan. 10, 1984, entitled Helically-Formed Pipe Winding Machine, abandoned.

FIELD OF THE INVENTION

This invention relates to an improved helically wound pipe winding machine and in particular it relates to a machine of the type in which a strip of any specific configuration is helically wound so that the edges of the strip overlap and lock together to form a pipe.

THE PRIOR ART

With machines of this type it is customary to use a strip which has a flat body section from which extend outwardly projecting ribs running longitudinally on the strip and spaced apart one from another to provide reinforcement to the body of the strip. In its usual form such a strip has along one edge a projecting locking member which is shaped so that it can engage in an appropriately shaped socket at the other edge of the strip when the strip is being helically wound to form a pipe, and various shapes of joining members are known which may be reinforced with added flaps or extensions on at least one of the edges of the strip.

The machine for winding such a strip may take various forms but according to one form, a series of rollers are positioned annularly about a longitudinal axis on which the tube is being formed and the strip is forcibly fed into a helical formation by being driven around under guidance of the rollers of the annulus which define the diameter of the finished pipe.

According to another form, the helical curvature of the strip is achieved by using special feed rollers such for instance as where the part which engages the strip and the overlapping portion has two diameters so that, when the two overlapping edges of the strip are forced together to provide the interlock, the strip being fed, and the pipe being formed, have differential pressures applied to them so that the join is made under such differential pressure.

The differential pressure is also used to give a required curvature to the strip to form a tube of a selected diameter, and various prior art literature refers to different methods of using such pressures to form a helical convolution at the joining rollers of the strip.

While the art of forming pipes from plastic strips is now well advanced and successful, certain problems exist in maintaining accuracy of the final tube and ease of formation as considerable pressures are applied to the strip when forming it into a pipe because of the rib construction.

Such mechanisms also require to be able to readily produce pipes of varying diameters and in some cases to vary the diameter during formation to produce tapered configuration but the present invention relates patricularly to the production of pipes of selected sizes by a simple mechanism which uses a feed roller or rollers to move the strip into the mechanism and then guides the strip into a helical convolution to cause one edge of the strip to engage the lock to the other edge of the strip as the pipe is produced.

OBJECTIVES AND SUMMARY OF THE INVENTION

One of the problems which exists with this type of apparatus is to be able not only to vary the diameter of the pipe being formed but to arrange the helical angle to allow correct relationship between the width of the strip and the diameter of the pipe and it is an object of the present invention to provide certain improvements to the mechanism to achieve this.

It is a further object to allow the diameter of the pipe being formed to be varied by simple adjustments to the mechanism.

It is a still further object to so arrange the mechanism that the rollers which guide the pipe during its helical convolution are sufficiently closely spaced to avoid bulging of the strip between the rollers.

It is a further object to move the strip to allow this helical winding to be effected in a better manner.

A further object is to provide an exact balance of the differential pressure which will form a strip of selected cross section into a helix to join contiguous edges of the strip to form a continuous pipe.

Basically the present machine comprises a roller cage formed by a pair of rings of generally circular form spaced apart and supporting between them annulus rollers to define a circle equal to the required diameter of the pipe to be formed and these rollers are mounted on adjusting means which enable the diameter to be selectively varied.

The strip is fed into the area defined by the annulus rollers at an angle equal to the angle of the helix required so that after one convolution under guidance of the rollers the locking member on the edge of the strip meets with the locking member on the other edge of the strip of the previous convolution to provide a continuous method of feeding in the strip and forming the pipe.

The invention thus relates to a machine for forming helically wound pipes from a strip in which a frame supports a pair of coaxial rings spaced apart and supporting rods which carry a series of rollers positioned to form an annulus of rollers to curve the strip fed into the annulus to a helical form with one edge portion of the strip fed into the annulus overlapping the opposite edge portion of the strip at the end of the first convolution of the strip to cause roller means at the joining station to press complementary interengaging configurations together to form a pipe, the rollers of the annulus being generally radially movable by the rings to increase or decrease the size of the annulus, a joining roller being positioned at the meeting of the first convolution with the strip and acting with a roller or pressure member to press the end of the convolution into locking engagement with the said strip, a pair of feed rollers being positioned remote from the joining rollers at a controlled distance therefrom to control the rate of feed of the strip to the joining rollers, driving means being provided for at least one of the joining rollers and for at least one of the feed rollers, the driving means and/or the rollers being arranged to maintain the strip between the joining rollers and the control rollers in tension.

The tension can be maintained by variation in the size of the rollers or the rate of revolution thereof.

The drawings show generally a ribbed strip, but a plain strip with edge interlocking means can equally be used.

Referring first to FIGS. 1 to 3, 6 and 12.

Figures 1, 2, 3:
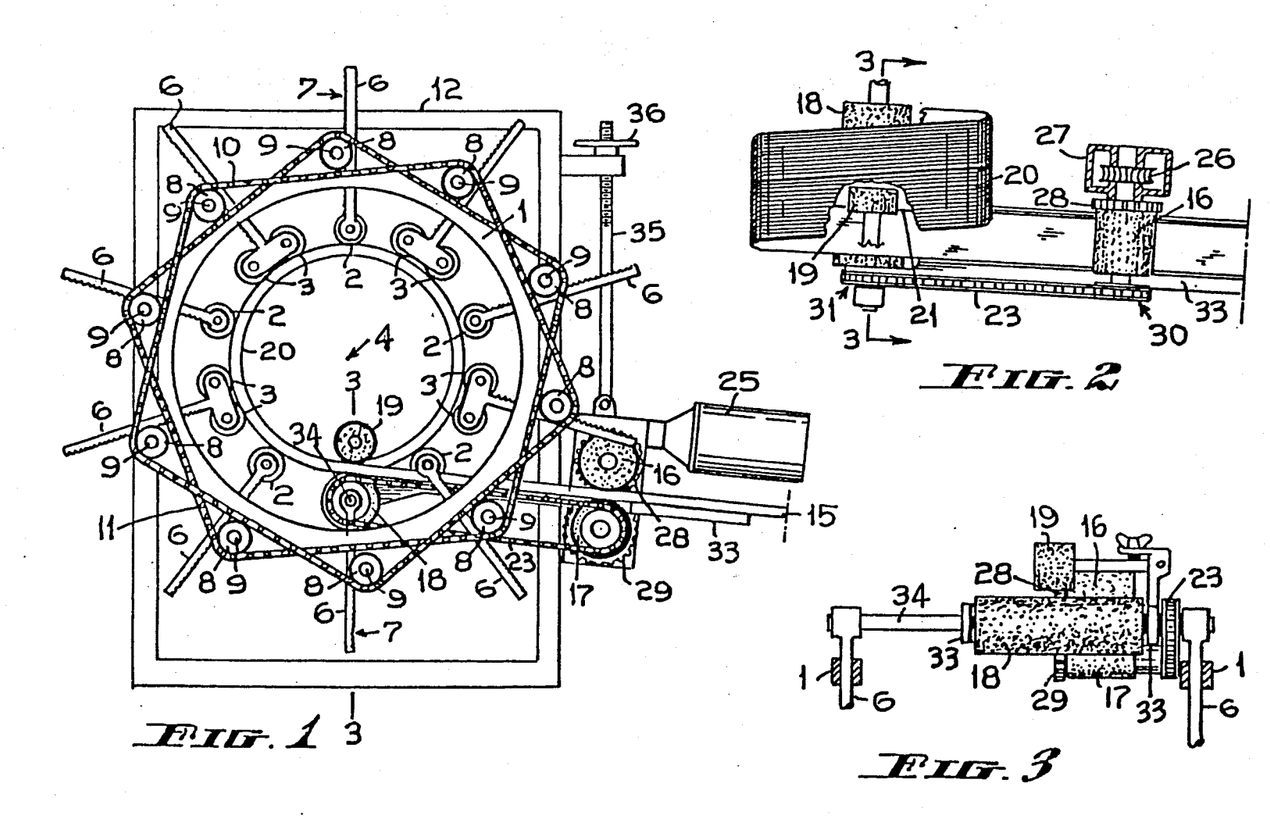
FIG. 1 is a somewhat schematic side elevation of a machine according to the present invention omitting the forward frame to show more clearly the chain couplings and the differential drive of the strip.
FIG. 2 is a sectional fragmented view of a strip fed into the machine and showing two convolutions of the strip, showing the actual differential drive arrangement for the strip and the pipe but omitting details of the frame and guide rollers.
FIG. 3 is an end elevation of a portion of the machine on line 3—3 of FIG. 1, showing only the drive mechanism by means of which the strip is fed into its helical configuration.

The machine comprises a pair of circular ring 1, which are spaced apart and which each carry a series of rollers 2 and 3 extending generally in the direction of the axis 4 of the pipe 5 being formed, and these rollers 2 and 3 are mounted on rods 6 which have longitudinal racks 7 on them engaged by pinions 8A on bearing means on the rings 1 so that by rotating the shafts 9 and thus the pinions the position of the rollers 2,3 radially can be adjusted. The shaft 9 and pinions are arranged in two pairs around the periphery of the frames 1 and are driven by chains 10 and 11 respectively on each side of sprockets 8 on the shafts 9 so that alternate rollers 2 and 3 can be independently moved, the reason for this being to allow some rollers to remain in an outer position when forming a small pipe but allowing the other rollers to be projected into operating position, allowing closer spacing between those rollers in use at the time. Each rod 6 can have either the single roller 2 as shown or twin rollers 3.

By this arrangement the chain 10 moves the one set of rollers 3 radially while the other chain 11 moves the interposed rollers 2 radially. The drives for the chains may be interconnected between the two sides of the machine so that a single control can be used to move all of the rollers simultaneously if it is required to maintain synchronism.

Figures 10, 11:
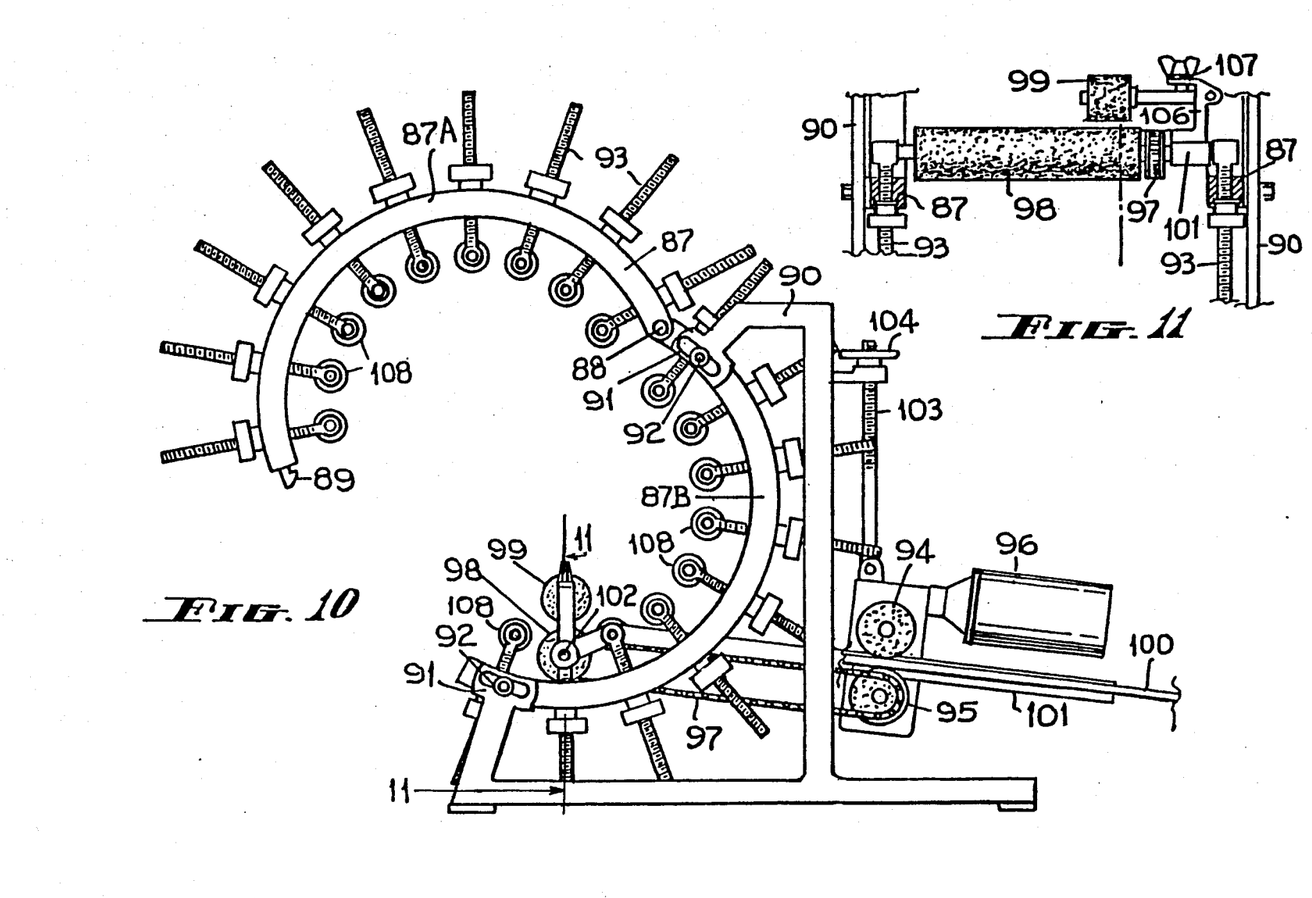
FIG. 10 is a view of a machine similar to that shown in FIGS. 4 to 9 but showing how the rings which carry the threaded rods can be split and hingedly interconnected so that the machine can be positioned to engage a tube already formed, or some other member which is to have a tube wrapped around it.
FIG. 11 is a section on line 11 of FIG. 10.

The rings 1—1 are supported on a main frame 12 to be coaxial but can be orientated independently by a mounting as shown in FIG. 10.

It is not necessary to use dual chains as will be seen from other embodiments described, but by having the sets of rollers 2,3 independently adjustable on the rings 1, one pair of rollers can be allowed to remain out of use. Thus the dual rollers 3 can be moved to define a smaller diameter of pipe and as the diameter of the pipe is increased and these rollers 3 require to be moved outwardly by their rack-and-pinion control, the single rollers 2 can be moved into the spaces between the rolles 3 to again give a close spacing of rollers although the rollers are defining a considerably larger diameter.

The mechanism which feeds the strip 15 to the annulus formed by the rollers 2 and 3 comprises a pair of drive rollers 16 and 17 remote from where the join is being made, and a further pair of feed rollers 18 and 19 where the strip is pressed together to form a junction between the strip 15 and the first convolution 20 of the pipe 5.

The feed rollers 16 and 17 at the first position engage both sides of the strip 15 to form driving means for the strip but the joining rollers 18 and 19 are so positioned that the roller 18 engages the strip and the convolutions forming the pipe but the other roller 19 engages the join 21 and extends from this position in the direction of the formed pipe so that the roller 18 supports the pipe 5 being formed but the roller 19 presses the join 21 together but extends to drive the first convolution 20 to serve as means for rotating the tube 5 as it is formed.

In the form shown the roller 18 is driven by a chain 23 from the roller 17.

The drive for the rollers 16 and 17 and the rollers 18 and 19 is derived from a motor 25 rotating a worm wheel assembly 26 in a gearbox 27, while the roller 17 is driven from the shaft of the roller 16 through a pair of gear rollers 28 and 29, the gearing and size of the rollers ensuring the same peripheral speed of the rollers 16 and 17.

The roller 18 is driven from the shaft of the roller 17 by the chain 23, and the diameter of the roller 18 and the chain sprockets 30 and 31, which are fixed on the shafts of the rollers 17 and 18, are so selected that the peripheral speed of the joining roller 18 is slightly higher than the peripheral speed of the feed rollers 16 and 17 so that the part of the strip between the feed rollers 16 and 17 and the joining rollers 18 and 19 is under tension.

Guide means 33 for the strip allow the strip to be fed from a roll to engage the drive rollers 16 and 17 with the strip itself in a horizontal position and by driving this pair of rollers 18 and 19 at a speed differential to the second pair of rollers 18 and 19 any required stress can be produced at the joining area, and this stress assists in forming the strip to its helical interlocking configuration so that by the present invention it is possible to provide the necessary differential stress at the joining area and also control the curvature of the strip into a helical form to move circularly around within the annulus of rollers 2 and 3 which ensure final determination of the diameter of the pipe being formed and give close control.

By orientating one of the mounting rings 1 in relation to one another about the axis of the pipe, as said, the annulus rollers carried by these rings can be adjusted in orientation to allow angle adjustment consistent with diameter adjustment to be effected and to allow adjustment also for strip width. FIG. 2 shows the need to align the strip 15 with the angle of the helix so that the strip guide 33 is at an angle to the axis of the pipe being formed.

The strip guide 33 pivots about the shaft 34 which carries the roller 18 so that as the roller 18 is adjusted simultaneously with the rollers 2 the correct feed of the strip 15 into the annulus takes place, the guide 33 carrying the rollers 16 and 17 and gearbox 27 and motor 25 and being suspended toward its free end by a threaded rod 35 having axial adjustment means 36 engaging a bracket on a main support frame 37 which also supports the rings 1.

The rings 1 are adjustable about their axes on the support frame 37 by means such as shown in the embodiment shown in FIG. 10.

The roller 19 rotates on an arm 38 carried by the guide 33, the arm having a loading screw 39 engage it to allow selection of the pressure the joining roller 19 exerts on the strip as the strip moves forward under the drive exerted by the roller 18.

It can be helpful if one or more of the rollers 2 and 3 which comprise the roller cage are also driven and rotated about their axes and this form will be described herein with reference to FIG. 4 to 9, as the second embodiment.

Beyond the two rings 1 a series of trolleys are provided which can run on tracks and which themselves can be moved axially in relation to the pipe to select their best position. Each of these trolleys can comprise a pair of frames so arranged that the position of carry rollers supported by the frames can be varied in relation to the axial position of the pipe being formed so that when the pipe lies on these carry rollers they form a continuation as it were in the same plane as the guide rollers 2 and 3 which are carried by the rings 1.

In FIG. 4 to 9 a pair of rings 45 carry rods 46, in this case, threaded which are axially confined but adjustable by nuts 47 and 48 and carry rollers 49 by means of self-aligning bearings 50, the rings 45 being supported by a frame 51 but adjustable thereon about the pipe axis by means as shown in FIG. 10. The guide 54 engages the shaft of the roller 49A at the joining roller locality which in this case is similar to the remaining rollers 49 which form the annulus, the free end of the strip guide 54 being supported by a link 55 joining it to the frame 51, this allowing adjustment of the roller 49A simultaneously with the remaining rollers 49 while maintaining correct feed of the strip into the annulus.

Figure 8:
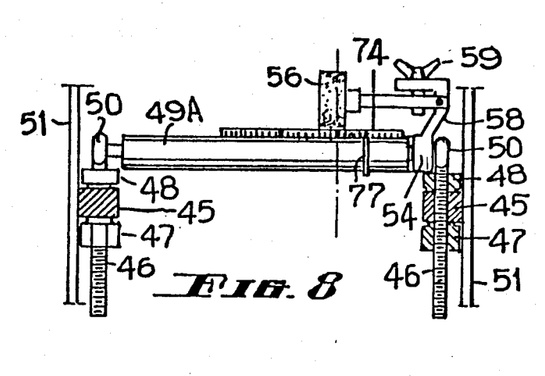
FIG. 8 is a view on line 8—8 of FIG. 4 but showing only the parts immediately on the section to show how one of the rings can locate the strip as it is fed into the helix and showing how the join is made by forcing down a pressure roller onto the join.
Figure 9:
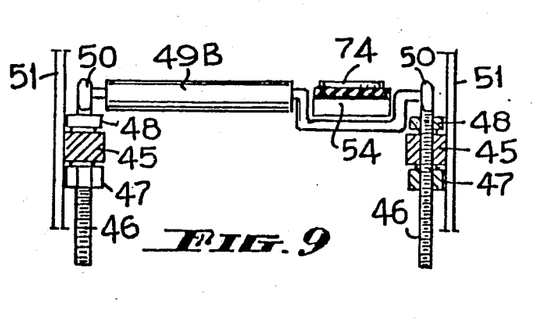
FIG. 9 is a view similar to FIG. 8 taken on line 9—9 of FIG. 4 but showing how the roller adjacent the strip feed-in locality is shortened and the axle bent to clear the strip and the guide for the strip.

As shown in FIG. 8 the roller 56 is mounted on an arm 57 pivoted to a bracket 58 connected to the rod 41, and the arm has a loading screw 59.

Figures 4, 5, 6:
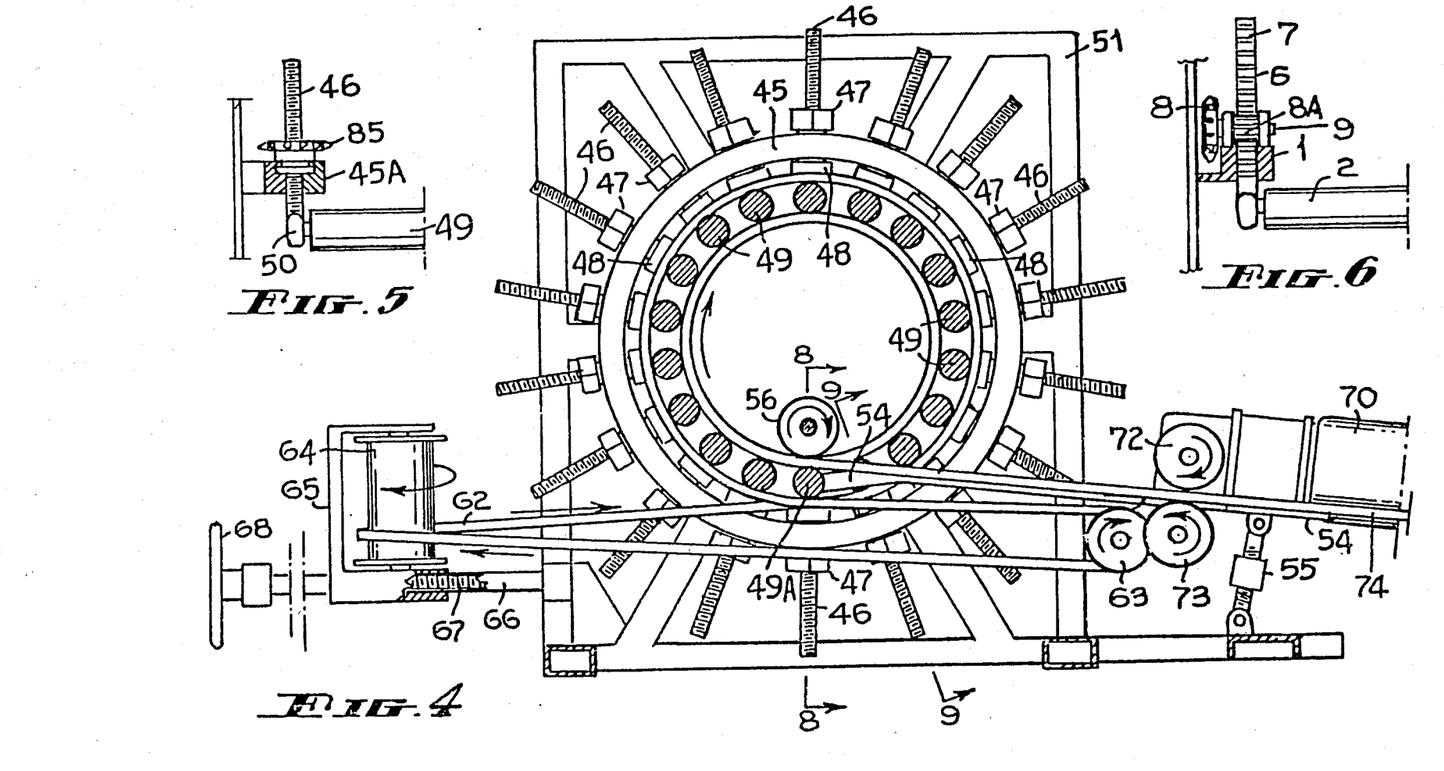
FIG. 4 is a side elevation of a modified form of the invention again with the forward frame removed, the machine in this case having the rollers of the annulus driven by means of a belt so as to rotationally drive the pipe as it is being formed as well as controlling the feed of the strip to the joining locality at which the join is made by overlapping the edge of the strip with the opposite edge of the first convolution.
FIG. 5 is a fragmentary view showing how instead of using independently adjustable threaded rods for the rollers of the annulus, a captive sprocket can be used at each rod locality with a chain passing around the annulus, the chain engaging opposite sides of adjacent sprockets, adjacent rods having opposite pitch of the thread.
FIG. 6 is a still further variation showing how a rack-and-pinion can be used with sprockets around which a chain can pass either in the manner of FIG. 1 or a single chain to simultaneously move all of the rods.

The roller 49B is shortened and its shaft shaped to allow the guide 54 to project past it. In this case, instead of driving only a roller at the joining locality, all rollers 49, 49A and 49B are driven by a belt 62 which encircles the rollers of the annulus and passes around a driving pulley 63 and a take-up drum 64, the drum 64 being rotationally mounted on a support 65 slidably carried on guide rods 66 projecting from the frame 51 and engaged by an axially confined threaded adjustment rod 67 which is rotated by a hand wheel 68, whereby the drum 64 can be positioned to maintain belt tension around the annulus of rollers 49 and the driving pulley 63.

The pulley 63 is driven from a motor 70 through a gearbox 71 which also drives the two feed rollers 72 and 73 which enage the strip 74 and control the rate of feed to the joining rollers, in this case the roller 49A and the pressure roller 56.

In this embodiment therefore the pipe is driven by each of the rollers 49, 49A and 49B to give an accurate constant drive, this drive being slightly faster than the feed by the feed rollers 72 and 73 so that the strip is maintained in tension between the feed rollers 72 and 73 and the joining rollers 49A and 56.

The hand-operated adjustment 67-68 could be replaced by spring or fluid pressure operated means moving the support 65 to automatically maintain the driving tension on the belt 62.

Figures 12, 13, 14, 15, 16, 17:
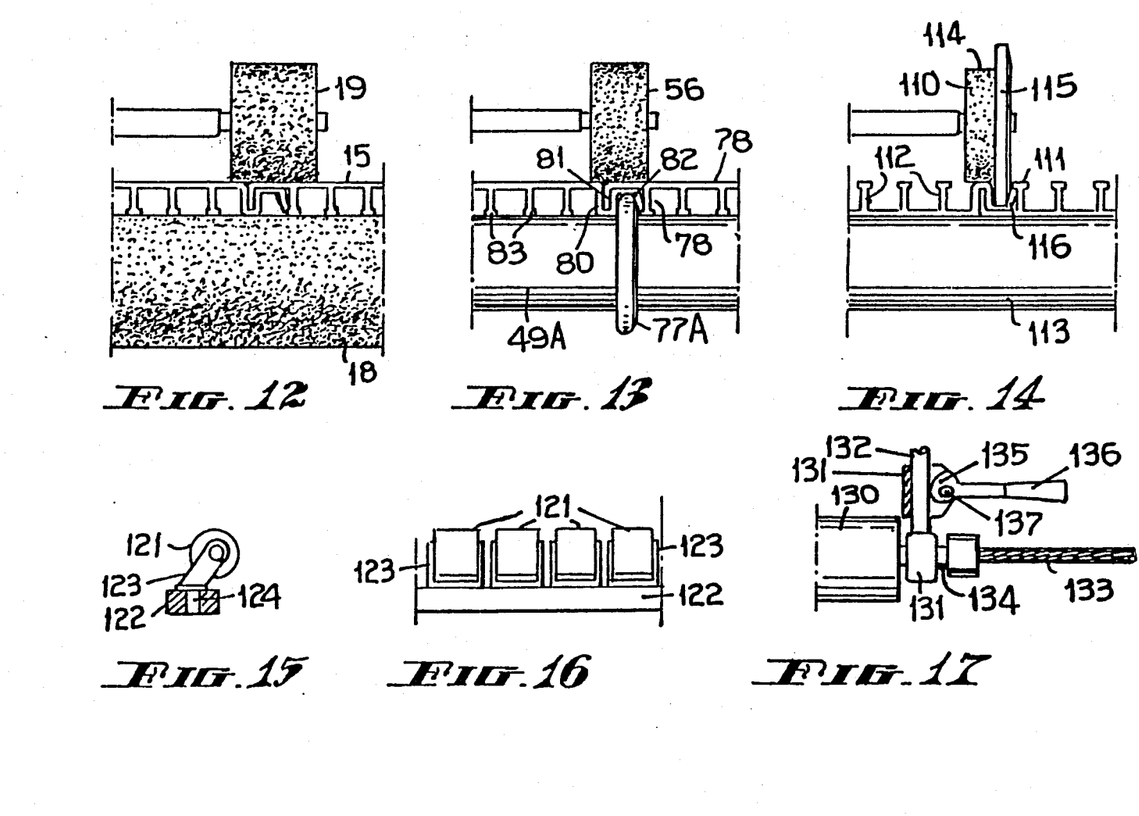
FIG. 12 is a fragmented view of the joining rollers of the machine shown in FIG. 1 or 10, showing a driving roller on which the strip being fed in rests, and a pressure roller which forces the join between the strip and start of the first convolution together.
FIG. 13 shows a modified form in which a driven roller, which is driven as in the form described with reference to FIG. 4, acting with a pressure roller, presses together the primary join and a ring makes a secondary seal.
FIG. 14 is a view similar to FIG. 13 but showing the strip inverted to have the ribs on the inside of the pipe and showing how a modified roller can press these edges together to make a primary and the secondary seal.
FIG. 15 is an end view of a segmented caster roller assembly showing the carrying bar sectioned.
FIG. 16 is a fragmentary side elevation of such a self-aligning roller.
FIG. 17 is a schematic view showing how the rollers may be driven by flexible cable means.

A series of rings 77 on the rollers 49 and if required the roller 49A as shown engage the strip 74 between selected ribs as shown particularly in FIG. 13, in which part of a typical strip is shown comprising a wall 78 and ribs 79, one edge portion of the strip having a rib 80 shaped to form a longitudinal groove engaged by a complementary locking projection 81 on the other edge of the strip, this ring 77A in this case also serving to press a locking flap 82 into the space between the groove forming rib 80 and the rib 78A, the ribs 78 and 78A having expanded ends 83 for further strength, and also the expanded end 83 in the rib 78A serves to secure the lock by having the edge of the locking flap 82 engaged behind the expanded end 83 of the rib 78A.

Figure 7:
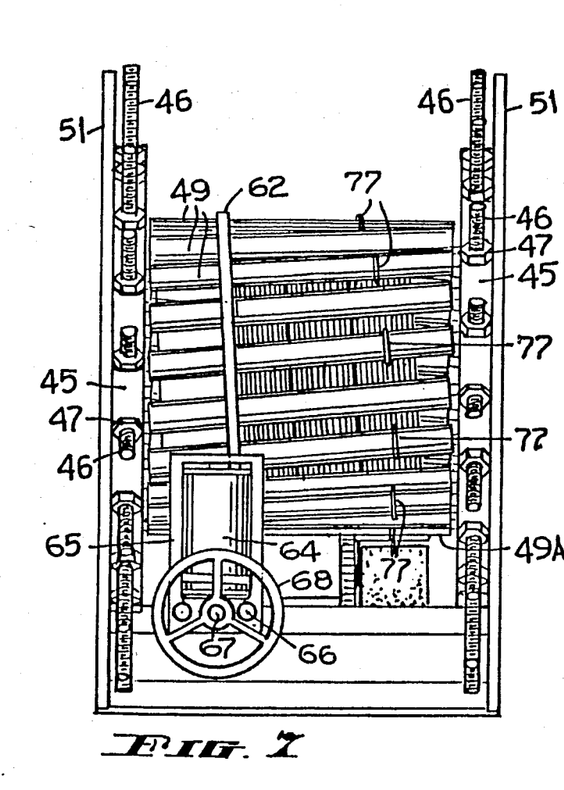
FIG. 7 is an end elevation of the machine showing how the strip can be guided by a series of rings on the rollers engaging between selected ribs of the strip as the tube is being formed.

The above described FIG. 13 of course has the ring 77A located at the joint, but as shown in FIG. 7 the rings 77 can be positioned at any part of the strip 74 so long as they engage between a pair of the ribs 79, when the strip is provided with ribs, the rings however being progressively further along the sequentially arranged rollers 49 to cause particularly the first convolution of the strip to follow an accurate helical path to cause the locking projection 81 to correctly engage in the groove in the rib 80 at the end of the first convolution.

Instead of using threaded rods axially positioned by nuts 42 and 43 as shown in FIG. 4, a simultaneous adjustment of all rods 41 can be effected by means similar to FIG. 1 and as detailed in FIG. 6, the embodiment of FIG. 5 can be used in which a sprocket 84 is captively mounted in a split ring 45A and is threaded to engage the screw thread on the rod 41.

By having alternate rods opposite thread pitch a chain can be passed on opposite sides of alternate sprockets 85 to extend circularly to drive all sprockets 85 simultaneously but in opposite direction to move all rods axially in the same direction because of the opposite pitch of alternate threads.

The rods of each embodiment may be plain, thus the rods 6 or 46 or 93 can pass through apertures in the rings 1, 45 or 87 and the rings can have clamping means such as cams to lock the rods. Such an embodiment is shown in FIG. 17 to be later described.

As at times it is necessary to encase a first pipe or similar elongated member with a helically-formed pipe, the embodiment of FIGS. 10 and 11 show how this can be achieved, the embodiment showing the general assembly of rollers 49 of FIG. 4 and the strip drive of FIG. 1, but the rings 87 are each formed in two parts 87A and 87B, connected together by a hinge 88 and having detent means 89 to lock the rings together.

The frame 50 has slotted ends 91 through which bolts 92 pass to lock the rings 87 to the frame 90 but allowing adjustment about the pipe axis to slope the rollers to suit the helix of the pipe, depending on the width of the strip and the diameter of the pipe being formed. In this embodiment the threaded rods are designated 93, the feed rollers 94 and 95 being driven from the motor 96, the chain 97 driving the roller 98 at the joining locality while the roller 99 is the pressure roller to press the strip 100 onto the joining roller 98. The strip guide 101 is again pivoted on the axis of the shaft 102 of the roller 98 carried by the rod 93A, while the free end of the strip guide 101 is suspended by a rod 103 with adjustment means 104.

The threaded rods 93 and 93A are controlled axially by nuts 105 captive on the rings 87.

The roller 99 is carried on a bracket 106 projecting from the strip guide 101 and has loading means in the form of a threaded rod 107.

The roller of the annulus are designated 108.

FIG. 14 shows how a joining roller 110 may be used when the strip 111 is inverted to have the ribs 112 inwardly projecting in a pipe, the driven joining roller 113 being plain but the joining roller having a main pressure face 114 and a ring 115 to press the flap 116 into position, the effect being similar to that described with reference to FIG. 13.

As stated earlier herein there is a critical condition which has to be met which relates firstly to the angle that the strip is fed into the cage and secondly the angle of the rollers that guide the strip to their proper helical configuration and ensure that the strip finishes with the exact diameter pipe required.

Therefore according to FIGS. 15 and 16 the rollers 2, 3 or 49 can comprise a series of segmetns 118 which can adjust independently to variation in peripheral speed at selected localities of the helix, and are self-aligning with the direction of the force which is being exerted by the annulus rollers.

This can also be achieved by having rollers 121 which themselves need not rotate, extending along the line of the original rollers, but these rollers 121 are mounted to caster so that they can take the direction of the force exerted. Thus, instead of having to very carefully align the annulus rollers the contacting members now align themselves according to the force at the particular locality.

The bar 127 carries the rollers 121 by means of forks 123 having spindles 124 engaging the bars 122.

In FIG. 17 is shown one end of a roller 130 supported by a self-aligning bearing 131 on a rod 132, showing how the roller could be driven by flexible drive cables 133 engaging the spindles 134 of the rollers. A series of such cables could be synchronously driven from a gearbox with the required drive outlets. This assembly can be applied for instance in the form of FIG. 4 as it allows the diameter of the annulus to be varied.

In this illustration the rod 132 is plane and is locked in position by a cam 135 on a lever 136 pivoted at 137 to the ring 138 which corresponds to the rings 1, 45 and 87.

Although in the embodiments described, a roller 19, 56 or 99 is shown as the pressure member to press the strip onto the joining roller 18, 49A or 98, this can ge replaced by a flat member, this being particularly applicable in FIG. 10 where the pipe is formed over another pipe.

I claim:

1. A machine for forming helically wound pipe from a plastic ribbed preformed strip comprising a frame, a series of rollers axially extending and rotatably mounted on spaced apart end rings, said rings being mounted in said frame for rotation in opposite directions, said rollers being positioned to form an annulus of rollers arranged to curve the strip to a helical form within the annulus with the edges of the strip overlapping, joining means carried by said rings to press the overlapping edges together to form a pipe, said joining means comprising a joining roller on a shaft supported by said rings and a pressure member positioned at the meeting of the first convolution with the strip to press the end of the convolution into locking engagement with the said strip, a strip guide engaging at one end the said shaft of the joining roller and projecting tangentially to the annulus, a pair of feed rollers remote from the said joining roller mounted on an opposite end of said strip guide to control the rate of feed of the strip to the joining rollers, and driving means for the joining roller and for at least one of the feed rollers to cause the said joining roller to have a greater peripheral speed than the said feed rollers whereby to maintain the strip between the joining roller and the said feed rollers in tension, whereby when rotating said one ring opposite to the other the angle of the said annulus of rollers and the said strip guide are variable in relation to the axis of the pipe being formed to compensate for diameter and strip width.

2. A machine for forming helically wound pipes from a strip comprising a frame, a series of rollers positioned to form an annulus of rollers arranged to curve a strip to a helical form within the annulus with the edges of the strip overlapping, a pair of rings spaced apart on said frame and mounted for rotation in opposite directions, said rings engaging shafts of the said rollers whereby the angle of the rollers relative to the axis of the said annulus is adjustable by relative rotation of said rings, means to drive the rollers of the annulus synchronously, a joining roller forming part of the said annulus and a pressure member positioned at the meeting of the first convolution with the strip to press the end of the convolution into locking engagment with the said strip, a strip guide engaging at one end the shaft of the said joining roller and projecting tangentially to the annulus, a pair of feed rollers at an opposite end of the said strip guide remote from the said joining roller, driving means between the said annulus rollers and the feed rollers to cause the said joining roller to have a greater peripheral speed than the said feed rollers to maintain the strip between the joining roller and the feed rollers in tension whereby when rotating said one ring opposite to the other the angle of the said annulus of rollers and the said strip guide are variable in relation to the axis of the pipe being formed to compensate for diameter and strip width.

3. A machine for forming helically wound pipes from a strip comprising a frame, an annulus of rollers, a pair of coaxial rings supported by said frame for rotation in opposite directions about their axes and spaced apart, supporting rods on said rings axially adjustable on said rings to carry the rollers of the said annulus to curve the strip fed into the annulus to a helical form with one edge portion of the strip fed into the annulus overlapping the opposite edge portion of the strip at the end of the first convolution of the strip, opposite rotational adjustment of the said rings allowing the angle of the helix of the strip being wound to be changed in relation to the axis of the pipe being wound, a joining roller forming part of said annulus at a joining station, pressure means at the joining roller to press com-plementary interengaging configurations together to form a pipe, said pressure means being a roller having its axis parallel to the axis of the said joining roller, means urging the said pressure roller toward the said joining roller, said rollers of the said annulus and said joining roller being generally radially movable by the said supporting rings to increase or decrease the size of the annulus, a strip guide engaging at one end the shaft of the said joining roller and projecting tangentially to the annulus of rollers, a pair of feed rollers on said strip guide remote from the said joining roller adapted to be driven to control the rate of feed of the strip to the joining rollers, driving means for the joining roller and for at least one of the feed rollers being arranged to cause the peripheral speed of the said joining means to be greater than that of the said feed rollers to maintain the strip between the joining rollers and the control rollers in tension.

4. A machine according to claim 1 characterised in that the said pressure member is a roller mounted to be urged toward said joining roller and having its axis parallel thereto.

5. A machine accordng to claim 3 characterised by endless driving means extending around the perimeter of the said rollers of the said annulus and engaging the said rollers to synchronously drive the said rollers, and means to drive the said driving means to advance the said strip around within the rollers of the said annulus at a rate to maintain tension in the strip between the said joining roller and the said feed rollers.

6. A machine according to claim 5 wherein the said driving means for the rollers of the said annulus comprise a belt passing around the perimeter of the said rollers of the annulus, said belt passing also around a driving roller and a drum remote from the said annulus of rollers and spaced from each other, and means to adjust the position of said drum to tension the said belt.

7. A machine according to claim 3 in which the said rings are split and provided with hinge means between the said split parts of the said rings to allow the said annulus to be opened to engage over a member about which the said pipe is to be formed.

8. A machine according to claim 3 in which the said rollers of the annulus are driven by flexible drive cables engaging the one end of shafts of the said rollers and adapted to be driven by drive means.

9. A machine according to claim 3 characterised by a series of rings on the said rollers of the said annulus spaced to engage at least the said first convolution and guide it on a helical path.

10. A machine according to claim 3 characterised by a ring on one of the said pair of joining rollers positioned to press a lock on one edge of the strip which is being helically wound into a complementary recess of the other edge of the said strip.

11. A machine for forming helically wound pipes from a plastic longitudinally ribbed strip having interconnecting means along its longitudinal edge portions comprising a frame, a series of longitudinally extending rollers forming an annulus about a longitudinal axis, first and second rings supported on said frame spaced apart about said axis and rotationally adjustable in opposite direction about said axis, radially adjustable bearing means on said rings to engage and support shafts of said rollers, means to drive one said roller of the annulus to form a driving roller for the said strip, means to press the strip on to the said driving roller, a strip guide pivoted at one end about the axis of the said driving roller and extending normally therefrom, feed rollers supported on the free end of the said driving roller arranged to engage the said strip, means coupling the said driving roller rotationally to the said feed roller and to drive the said driving roller and feed rollers to cause the feed roller to have a greater peripheral speed than the said driving roller whereby to maintain a strip in tension between the said feed rollers and the said joining roller.

12. A machine according to claim 11 characterised by coupling means to adjust the said bearings radially simultaneously.

13. A machine according to claim 2 characterised in that the said pressure member is a roller mounted to be urged toward said joining roller and having its axis parallel thereto.

* * * * *